US009907133B2

(12) United States Patent
    Matsui

(10) Patent No.: US 9,907,133 B2
(45) Date of Patent: *Feb. 27, 2018

(54) BACKLIGHT DEVICE AND BACKLIGHT CONTROL METHOD

(71) Applicant: NEC Display Solutions, Ltd., Tokyo (JP)

(72) Inventor: Katsuyuki Matsui, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,589

(22) Filed: Jan. 6, 2017

(65) Prior Publication Data
    US 2017/0118813 A1    Apr. 27, 2017

Related U.S. Application Data

(63) Continuation of application No. 14/352,301, filed as application No. PCT/JP2011/074312 on Oct. 21, 2011, now Pat. No. 9,565,730.

(51) Int. Cl.
    H05B 33/02    (2006.01)
    H05B 33/08    (2006.01)
    (Continued)

(52) U.S. Cl.
    CPC ... H05B 33/0848 (2013.01); G02F 1/133621 (2013.01); G09G 3/342 (2013.01);
    (Continued)

(58) Field of Classification Search
    CPC .................. H05B 37/0218; H05B 33/0854
    (Continued)

(56) References Cited

U.S. PATENT DOCUMENTS 7,319,298 B2 *  1/2008  Jungwirth ............ H05B 33/086
                                                  250/216
7,872,430 B2 *  1/2011  Roberts ................ G09G 3/3406
                                                  315/291
(Continued)

FOREIGN PATENT DOCUMENTS

CN      1776497 A     5/2006
JP   2008-262032 A    10/2008
(Continued)

OTHER PUBLICATIONS

Office Action in U.S. Appl. No. 14/352,301 dated Jul. 23, 2015.
(Continued)

Primary Examiner — Jason M Crawford
(74) Attorney, Agent, or Firm — McGinn IP Law Group, PLLC.

(57) ABSTRACT

A backlight device includes a plurality of light sources that emit light of different colors from each other, a plurality of color sensors that receive mixed-color light including light emitted from the light sources to detect light emission states of the light sources, a temperature sensor that measures a temperature in a proximity of the plurality of light sources, a brightness conversion unit that separates the mixed-color light to obtain a detection value for each of the light sources by converting values indicating the detected light emission states, and a calculation unit that corrects the obtained detection value by using information indicating a relationship between the measured temperature and a correction value, the calculation unit determining drive values for the light sources based on the corrected detection value.

17 Claims, 7 Drawing Sheets

(51) Int. Cl.
    *G02F 1/1335* (2006.01)
    *G09G 3/34* (2006.01)
    *G09G 3/36* (2006.01)
(52) U.S. Cl.
    CPC .............. *G09G 3/3413* (2013.01); *G09G 3/36* (2013.01); *G09G 2320/041* (2013.01); *G09G 2320/0626* (2013.01); *G09G 2320/0666* (2013.01); *G09G 2360/145* (2013.01); *G09G 2360/16* (2013.01)
(58) Field of Classification Search
    USPC ......... 315/149–152, 291, 294, 297, 307–309
    See application file for complete search history.

(56) References Cited

U.S. PATENT DOCUMENTS

| | | | | |
|---|---|---|---|---|
| 8,278,846 | B2* | 10/2012 | Roberts | G09G 3/3413 315/224 |
| 8,514,210 | B2* | 8/2013 | Roberts | G09G 3/3426 315/308 |
| 8,829,820 | B2* | 9/2014 | Roberts | G09G 3/3406 315/185 S |
| 9,565,730 | B2* | 2/2017 | Matsui | G09G 3/3413 |
| 2006/0245174 | A1* | 11/2006 | Ashdown | H05B 33/0818 362/85 |
| 2009/0302781 | A1* | 12/2009 | Peker | G09G 3/3413 315/297 |
| 2009/0303412 | A1* | 12/2009 | Ake | G09G 3/3426 349/61 |
| 2010/0072901 | A1* | 3/2010 | De Rijck | H05B 33/0818 315/152 |
| 2010/0277077 | A1* | 11/2010 | Pong | H05B 33/0818 315/152 |

FOREIGN PATENT DOCUMENTS

| | | |
|---|---|---|
| JP | 4508754 B2 | 7/2010 |
| JP | 4666387 B2 | 4/2011 |
| JP | 4714297 B2 | 6/2011 |

OTHER PUBLICATIONS

Office Action in U.S. Appl. No. 14/352,301 dated Nov. 16, 2015.
Office Action in U.S. Appl. No. 14/352,301 dated Apr. 8, 2016.
Office Action in U.S. Appl. No. 14/352,301 dated Jul. 20, 2016.
Notice of Allowance in U.S. Appl. No. 14/352,301 dated Sep. 28, 2016.
International Search Report in PCT/JP2011/074312 dated Jan. 10, 2012 (English Translation Thereof).
Chinese Office Action dated Oct. 9, 2015 in Chinese Patent Application No. 201180074282.4 with English Translation.

* cited by examiner

BACKLIGHT DEVICE AND BACKLIGHT CONTROL METHOD

The present application is a Continuation Application of U.S. patent application Ser. No. 14/352,301, filed on Apr. 16, 2014, which is based on International Application No. PCT/JP2011/074312, filed on Oct. 21, 2011, the entire contents of which are incorporated herein by reference.

TECHNICAL FIELD

The present invention relates to a backlight device and a backlight control method.

BACKGROUND ART

Liquid crystal display devices of conventional art include an RGB color filter substrate, a liquid crystal layer, and a backlight device. It is proposed in the backlight device of this type of liquid crystal display device that red (R), green (G), and blue (B) colors are mixed to emit white color light to improve the display color reproduction range in the liquid crystal display device.

In the backlight devices of the conventional art, brightness of emitted light is detected by color sensors with color filters that comply with spectral characteristics corresponding to each color of RGB LEDs (light emitting diodes). Then, a calculation means of the backlight device controls output to the backlight of each color so that the brightness and chromaticity of the mixed white color light take predetermined values. After light emission is started, the temperature of a connection unit in the light emitting diode interior rises due to the heat generated by the light emitting diode itself, causing the brightness of each light emitting diode to change. Consequently, there is a device in which the current light emission amount is controlled to be a predefined standard light emission amount (for example, refer to Patent Document 1).

Prior Art Document

Patent Document

[Patent Document 1] Japanese Unexamined Patent Application, First Publication No. 2008-262032

SUMMARY OF THE INVENTION

Problem to be Solved by the Invention

However, in the technique disclosed in Patent Document 1, the color temperature takes time to converge, for some color temperatures that are set to white by the operation unit of the liquid crystal display device.

The present invention takes into consideration the above problem, and an exemplary object thereof is to provide a backlight device and a backlight control method capable of reducing the length of time taken to converge to a set color temperature, regardless of the set color temperature of white.

Means for Solving the Problem

In order to achieve the above object, a backlight device according to the present invention includes: alight emitting unit of a plurality of light sources of different light emission colors; a detection unit that detects light emission states of the plurality of light sources; a temperature sensor that measures a temperature in a proximity of the plurality of light sources; a brightness conversion unit that converts values indicating the light emission states detected by the detection unit into a detection value for each component of the light emission colors; and a calculation unit that performs temperature correction on the detection value converted by the brightness conversion unit for each of the light emission colors by using information when determining drive values for the light sources based on the detection values, the information indicating a relationship between the temperature measured by the temperature sensor and a correction value.

In order to achieve the above object, the present invention provides a backlight control method for a backlight device that controls a light emission amount of a light emitting unit of a plurality of light sources of different light emission colors, which includes: a detection step of detecting, by a detection unit, light emission states of the plurality of light sources; a temperature measuring step of measuring, by a temperature sensor, a temperature in a proximity of the plurality of light sources; a brightness conversion step of converting, by a brightness conversion unit, values indicating the light emission states detected in the detection step into a detection value for each component of the light emission colors; and a calculation step of performing temperature correction, by a calculation unit, on the detection value converted in the brightness conversion step for each of the light emission colors by using information when determining drive values for the light sources based on the detection values, the information indicating a relationship between the temperature measured in the temperature measuring step and a correction value.

Effect of the Invention

The backlight device of the present invention is such that the conversion unit converts the light emission state detected by the detection unit into a detection value for each light source. The calculation unit performs temperature correction on the detection values converted by the conversion unit using a predefined temperature correction coefficient for each light emission color, when determining drive values for the light sources based on the detection values. As a result, the length of time taken to converge to a set color temperature can be reduced regardless of the set color temperature of white.

EMBODIMENTS FOR CARRYING OUT THE INVENTION

First, a brief overview of the present invention is described.

In a backlight device used in such as a liquid crystal display device, the light amount of backlight is detected with a color sensor that includes a color filter. Due to the spectral characteristic of the color filter, the color sensor also detects the light amount of backlight other than that of the color that needs to be detected. In the present exemplary embodiment, the conversion unit converts a detection value detected by the color sensor into a light amount for each color emitted by the backlight, using a conversion equation. Then the temperature correction unit performs temperature correction on the detection value for each color that is converted by the conversion unit.

Thereby, the brightness of the backlight with respect to temperature change is precisely controlled to suppress influence of temperature drift with respect to a white point setting.

First Exemplary Embodiment

Hereunder, exemplary embodiments of the present invention are described in detail, with reference to the drawings.

Figure 1:
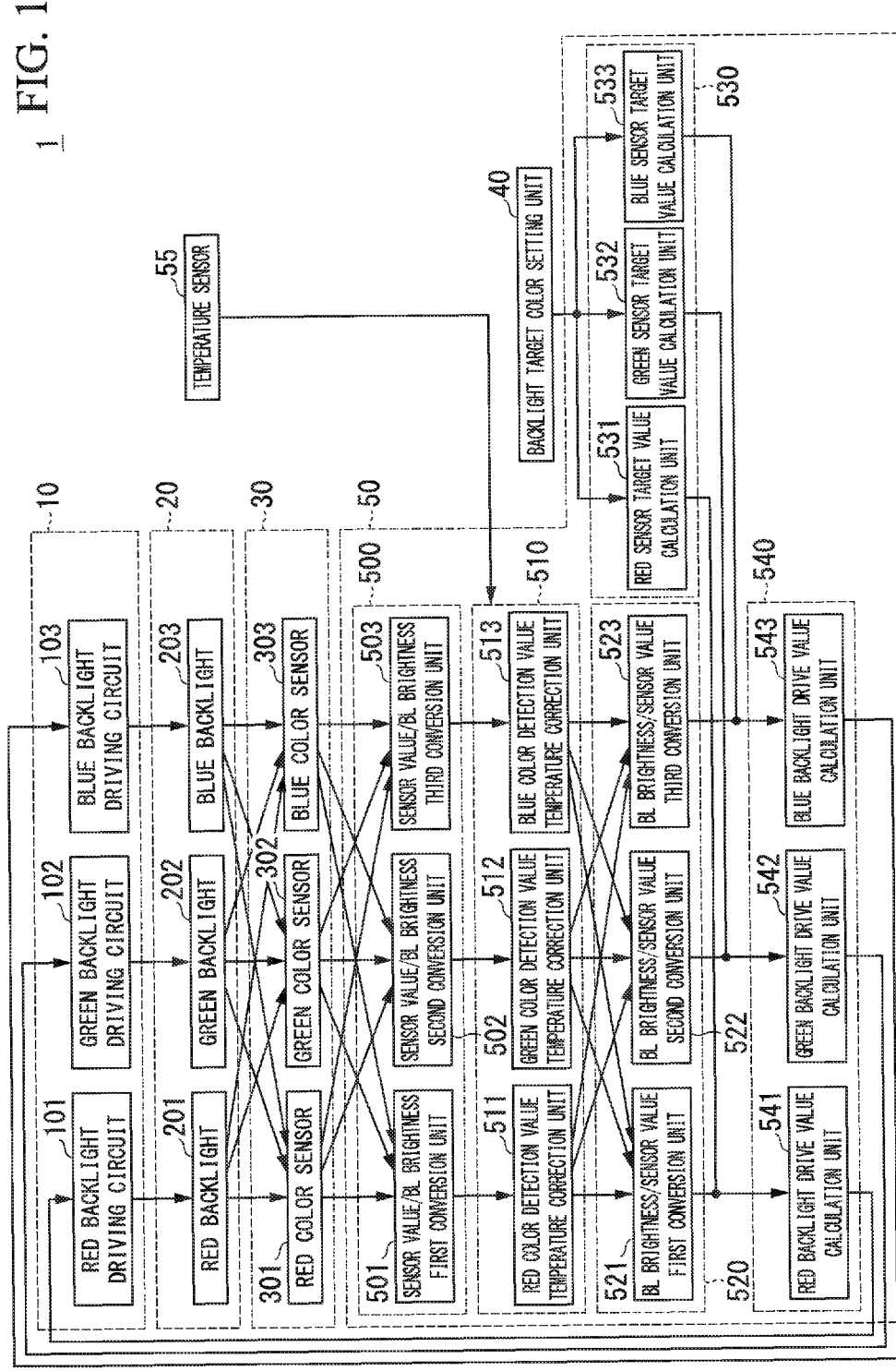
FIG. 1 is a block diagram of a schematic configuration of a backlight device according to a first exemplary embodiment.
Figure 2:
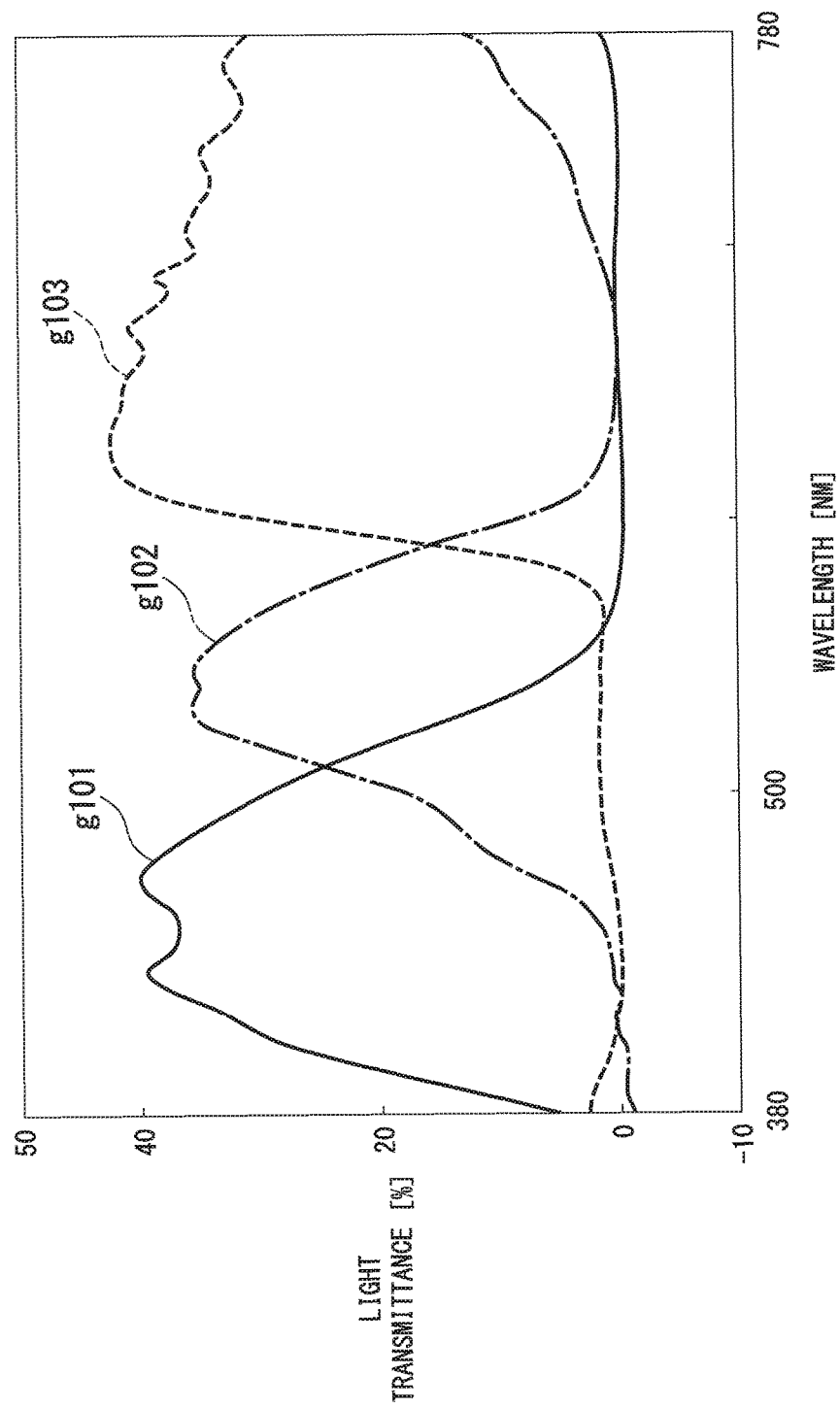
FIG. 2 is a diagram showing an example of a light transmission characteristic of an RGB color filter.

FIG. 1 is a block diagram of a schematic configuration of a backlight device 1 according to the present exemplary embodiment. As shown in FIG. 2, the backlight device 1 includes a backlight driving unit 10, a light emitting unit 20, a detection unit 30, a backlight target color setting unit 40, a temperature sensor 55, and a calculation unit 50.

The backlight driving unit 10 includes a red backlight driving circuit 101, a green backlight driving circuit 102, and a blue backlight driving circuit 103. The red backlight driving circuit 101 drives a red backlight 201 of the light emitting unit 20, based on driving signals output from a red backlight drive value calculation unit 541 of the calculation unit 50. The green backlight driving circuit 102 drives a green backlight 202, based on driving signals output from a green backlight drive value calculation unit 542. The blue backlight driving circuit 103 drives a blue backlight 203, based on driving signals output from a blue backlight drive value calculation unit 543.

The light emitting unit 20 includes a red backlight 201, a green backlight 202, and a blue backlight 203.

The red backlight 201 is a light source that emits red color light based on driving signals output from the red backlight driving circuit 101. The center wavelength of red color light is, for example, approximately 660 [nm]. The green backlight 202 is a light source that emits green color light based on driving signals output from the green backlight driving circuit 102. The center wavelength of green color light is, for example, approximately 540 [nm]. The blue backlight 203 is a light source that emits blue color light based on driving signals output from the blue backlight driving circuit 103. The center wavelength of blue color light is, for example, approximately 460 [nm].

The red backlight 201, the green backlight 202, and the blue backlight 203 are, for example, light emitting diodes (LEDs) or semiconductor lasers.

The detection unit 30 includes a red color sensor 301, a green color sensor 302, and a blue color sensor 303.

The red color sensor 301 has a color filter of a spectral sensitivity characteristic corresponding to the light emission color of the red backlight 201. The spectral sensitivity characteristic of the color filter of the red color sensor 301 is such that, for example, as with the curved line g103 in FIG. 1, the band with transmittance 20[%] or higher is approximately 590 [nm] to 720 [nm]. The red color sensor 301 receives light emitted from the light emitting unit 20, and detects the light emission state of the light emitting unit. The red color sensor 301 then converts the received light amount into an electric signal, and outputs the converted electric signal to the calculation unit 50 as a detection value Rs. The light emission state detected by the detection unit 30 is a detection value such as brightness or chromaticity. A detection value is described as brightness in the following description.

The green color sensor 302 has a color filter of a spectral sensitivity characteristic corresponding to the light emission color of the green backlight 202. The spectral sensitivity characteristic of the color filter of the green color sensor 302 is such that, for example, as with the curved line g102 in FIG. 1, the band with transmittance 20[%] or higher is approximately 480 [nm] to 600 [nm] like the curved line g102. The green color sensor 302 receives light emitted from the light emitting unit 20, then converts the received light amount into an electric signal, and outputs the converted electric signal to the calculation unit 50 as a detection value Gs.

The blue color sensor 303 has a color filter of a spectral sensitivity characteristic corresponding to the light emission color of the blue backlight 203. The spectral sensitivity characteristic of the color filter of the blue color sensor 303 is such that, for example, as with the curved line g101 in FIG. 1, the band with transmittance 20[%] or higher is approximately 400 [nm] to 540 [nm]. The blue color sensor 303 receives light emitted from the light emitting unit 20, then converts the received light amount into an electric signal, and outputs the converted electric signal to the calculation unit 50 as a detection value Bs.

Moreover, the red color sensor 301, the green color sensor 302, and the blue color sensor 303 are, for example, photo sensors.

The backlight target color setting unit 40 stores setting values for the red backlight 201, the green backlight 202, and the blue backlight 203 when emitting white color light, which have been preliminarily set by a user of the backlight device 1 for example. The backlight target color setting unit 40 outputs the set setting values to a red sensor target value calculation unit 531, a green sensor target value calculation unit 532, and a blue sensor target value calculation unit 533 of the calculation unit 50.

The setting values are, for example, values that are adjusted by a user while looking at a display of a display unit (not shown in the figure) so that the user feels the brightness of the red backlight 201, the green backlight 202, and the blue backlight 203 as white color light emission, and these values are set on an operation unit (not shown in the figure).

The temperature sensor 55 is attached in the proximity of the light emitting unit 20. The temperature sensor 55 detects temperatures, and outputs information indicating detected temperatures to a temperature correction unit 510.

The calculation unit 50 includes a sensor value/BL brightness conversion unit 500 (conversion unit), a temperature correction unit 510, a BL brightness/sensor value conversion unit 520, a sensor target value calculation unit 530, and a drive value calculation unit 540.

The sensor value/BL brightness conversion unit 500 includes a red color detection value temperature correction unit 511, a green color detection value temperature correction unit 512, and a blue color detection value temperature correction unit 513. The sensor value/BL brightness conversion unit 500 stores conversion equations, which have been preliminarily calculated by means of actual measurement and simulation.

[Equation 1]

$$\begin{bmatrix} R \\ G \\ B \end{bmatrix} = \begin{bmatrix} 1.007 & 0.016 & 0.005 \\ -0.155 & 1.225 & -0.017 \\ -0.046 & 0.014 & 1.093 \end{bmatrix} \times \begin{bmatrix} Rs \\ Gs \\ Bs \end{bmatrix} \quad (1)$$

In Equation (1), Rs denotes a detection value of the red color sensor 301, Gs denotes a detection value of the green color sensor 302, and Bs denotes a detection value of the blue color sensor 303. Furthermore, in Equation (1), R denotes a detection value of the component of the red color sensor 301, G denotes a detection value of the component of the green color sensor 302, and B denotes a detection value of the component of the blue color sensor 303. Hereunder, the red color sensor 301, the green color sensor 302, and the blue color sensor 303 are collectively referred to as color sensors 300.

A sensor value/BL brightness first conversion unit 501 converts the detection value Rs detected by the red color sensor 301, the detection value Gs detected by the green color sensor 302, and the detection value Bs detected by the blue color sensor 303 into a detection value R of the red backlight component, using Equation (1). The sensor value/BL brightness first conversion unit 501 outputs the converted detection value R of the component of the red backlight 201, to the red color detection value temperature correction unit 511.

Similarly, a sensor value/BL brightness second conversion unit 502 converts the detection value of the detection unit 30 into a detection value G of the green backlight component, using Equation (1). The sensor value/BL brightness second conversion unit 502 outputs the converted detection value G to the green color detection value temperature correction unit 512. A sensor value/BL brightness third conversion unit 503 converts the detection value of the detection unit 30 into a detection value B of the blue backlight component, using Equation (1). The sensor value/BL brightness third conversion unit 503 outputs the converted detection value B to the blue color detection value temperature correction unit 513.

The temperature correction unit 510 includes the red color detection value temperature correction unit 511, the green color detection value temperature correction unit 512, and the blue color detection value temperature correction unit 513. The temperature correction unit 510 receives input of information that indicates temperatures detected by the temperature sensor 55.

The red color detection value temperature correction unit 511 stores a temperature correction coefficient (correction value) for the detection value of the component of the red backlight 201 and a temperature that are associated with each other. This temperature correction coefficient is calculated preliminarily by means of actual measurement or simulation. The red color detection value temperature correction unit 511 corrects the detection value R output from the sensor value/BL brightness first conversion unit 501, using the information that indicates the temperature detected by the temperature sensor 55 and a temperature correction equation or a temperature correction coefficient for the component of the red backlight 201. The red color detection value temperature correction unit 511 outputs the corrected detection value R' to the BL brightness/sensor value conversion unit 520.

The green color detection value temperature correction unit 512 stores a temperature correction coefficient for the detection value of the component of the green backlight 202 and a temperature that are associated with each other. The green color detection value temperature correction unit 512 corrects the detection value G output from the sensor value/BL brightness second conversion unit 502, using the information that indicates the temperature detected by the temperature sensor 55 and a temperature correction equation or a temperature correction coefficient for the component of the green backlight 202. The green color detection value temperature correction unit 512 outputs the corrected detection value G' to the BL brightness/sensor value conversion unit 520.

The blue color detection value temperature correction unit 513 stores a temperature correction coefficient for the detection value of the component of the blue backlight 203 and a temperature that are associated with each other. The blue color detection value temperature correction unit 513 corrects the detection value B output from the sensor value/BL brightness third conversion unit 503, using the information that indicates the temperature detected by the temperature sensor 55 and a temperature correction equation or a temperature correction coefficient for the component of the blue backlight 203. The blue color detection value temperature correction unit 513 outputs the corrected detection value B' to the BL brightness/sensor value conversion unit 520.

The BL brightness/sensor value conversion unit 520 includes a BL brightness/sensor value first conversion unit 521, a BL brightness/sensor value second conversion unit 522, and a BL brightness/sensor value third conversion unit 523. The BL brightness/sensor value conversion unit 520 stores conversion equations, which have been preliminarily calculated by means of actual measurement or simulation.

[Equation 2]

$$\begin{bmatrix} Rs' \\ Gs' \\ Bs' \end{bmatrix} = \begin{bmatrix} 1.007 & 0.016 & 0.005 \\ -0.155 & 1.225 & -0.017 \\ -0.046 & 0.014 & 1.093 \end{bmatrix}^{-1} \times \begin{bmatrix} R' \\ G' \\ B' \end{bmatrix} \quad (2)$$

The BL brightness/sensor value first conversion unit 521 converts the temperature-corrected detection values (R', G', and B'), which are output from the temperature correction unit 510, into a detection value Rs' of the red color sensor, using Equation (2). The BL brightness/sensor value first conversion unit 521 outputs the converted detection value Rs' to the red backlight drive value calculation unit 541.

Similarly, the BL brightness/sensor value second conversion unit 522 converts the temperature-corrected detection values (R', G', and B'), which are output from the temperature correction unit 510, into a detection value Gs' of the green color sensor, using Equation (2). The BL brightness/sensor value second conversion unit 522 outputs the converted detection value Gs' to the green backlight drive value calculation unit 542. The BL brightness/sensor value third conversion unit 523 converts the temperature-corrected detection values (R', G', and B'), which are output from the temperature correction unit 510, into a detection value Bs' of the blue color sensor, using Equation (2). The BL brightness/sensor value third conversion unit 523 outputs the converted detection value Bs' to the blue backlight drive value calculation unit 543.

The sensor target value calculation unit 530 (target value calculation unit) includes a red sensor target value calculation unit 531, a green sensor target value calculation unit 532, and a blue sensor target value calculation unit 533. The red sensor target value calculation unit 531 calculates a target value for the detection value of the red color sensor 301, based on a setting value for the red backlight 201 at the time of white color light emission, which is output from the backlight target color setting unit 40. The red sensor target value calculation unit 531 outputs the calculated target value for the detection value of the red color sensor 301 to the red backlight drive value calculation unit 541. The green sensor target value calculation unit 532 calculates a target value for the detection value of the green color sensor 302, based on a setting value for the green backlight 202 at the time of white color light emission, which is output from the backlight target color setting unit 40. The green sensor target value calculation unit 532 outputs the calculated target value for the detection value of the green color sensor 302 to the green backlight drive value calculation unit 542. The blue sensor target value calculation unit 533 calculates a target value for the detection value of the blue color sensor 303, based on a setting value for the blue backlight 203 at the time of white color light emission, which is output from the backlight target color setting unit 40. The blue sensor target value calculation unit 533 outputs the calculated target value for the detection value of the blue color sensor 303 to the blue backlight drive value calculation unit 543.

The drive value calculation unit 540 includes a red backlight drive value calculation unit 541, a green backlight drive value calculation unit 542, and a blue backlight drive value calculation unit 543.

The red backlight drive value calculation unit 541 compares the target value for the detection value of the red color sensor 301, which is output from the red sensor target value calculation unit 531, with the detection value Rs', which is output from the BL brightness/sensor value first conversion unit 521. The red backlight drive value calculation unit 541 generates a driving signal of the red backlight 201 based on the result of the comparison. The red backlight drive value calculation unit 541, for example, generates a driving signal of the red backlight 201 that makes the difference between the detection value of the red color sensor 301 and the detection value Rs' zero. Specifically, if the detection value Rs' is higher than the detection value of the red color sensor 301, the red backlight drive value calculation unit 541 calculates a driving signal that is smaller than the value of the signal currently driving the red backlight 201, in order to lower the brightness value. If the detection value Rs' is lower than the detection value of the red color sensor 301, the red backlight drive value calculation unit 541 calculates a driving signal that is greater than the value of the signal currently driving the red backlight 201, in order to raise the brightness value. The red backlight drive value calculation unit 541 outputs the generated driving signal to the red backlight driving circuit 101 of the backlight driving unit 10.

The green backlight drive value calculation unit 542 compares the target value for the detection value of the green color sensor 302, which is output from the green sensor target value calculation unit 532, with the detection value Gs', which is output from the BL brightness/sensor value second conversion unit 522. The green backlight drive value calculation unit 542 generates a driving signal of the green backlight 202 based on the result of the comparison, and outputs the generated driving signal to the green backlight driving circuit 102.

The blue backlight drive value calculation unit 543 compares the target value for the detection value of the blue color sensor 303, which is output from the blue sensor target value calculation unit 533, with the detection value Bs', which is output from the BL brightness/sensor value third conversion unit 523. The blue backlight drive value calculation unit 543 generates a driving signal of the blue backlight 203 based on the result of the comparison, and outputs the generated driving signal to the blue backlight driving circuit 103.

Next, the spectral characteristic of the color filter provided in the color sensor 300 is described, with reference to FIG. 2. FIG. 2 is a diagram showing an example of a light transmission characteristic of an RGB color filter.

In FIG. 2, the horizontal axis represents wavelength, the vertical axis represents light transmittance, the curved line g101 represents light transmittance with respect to the wavelength of the blue filter, the curved line g102 represents light transmittance with respect to the wavelength of the green filter, and the curved line g103 represents light transmittance with respect to the wavelength of the red filter. As shown in FIG. 2, the band where the blue filter transmittance is 20[%] or higher is approximately 400 [nm] to 540 [nm] as seen from the curved line g101. The band where the green filter transmittance is 20[%] or higher is approximately 480 [nm] to 600 [nm] as seen from the curved line g102. The band where the red filter transmittance is 20[%] or higher is approximately 590 [nm] to 720 [nm] as seen from the curved line g103. The respective filters have the spectral characteristic shown in FIG. 2, and therefore, the green color sensor also detects the light amount with approximate wavelength 450 [nm] to 540 [nm] for example. Moreover, the red color sensor also detects few [%] of the light amount with approximate wavelength 380 [nm] to 540 [nm] of the blue band. Furthermore, the red color sensor also detects few [%] to 20[%] of the light amount with approximate wavelength 570 [nm] to 600 [nm] of the green band.

Therefore, in the present exemplary embodiment, the sensor value/BL brightness conversion unit 500 separates the detection value detected by the detection unit 30 into the respective color components of the backlight, using Equation (1).

Figure 3:
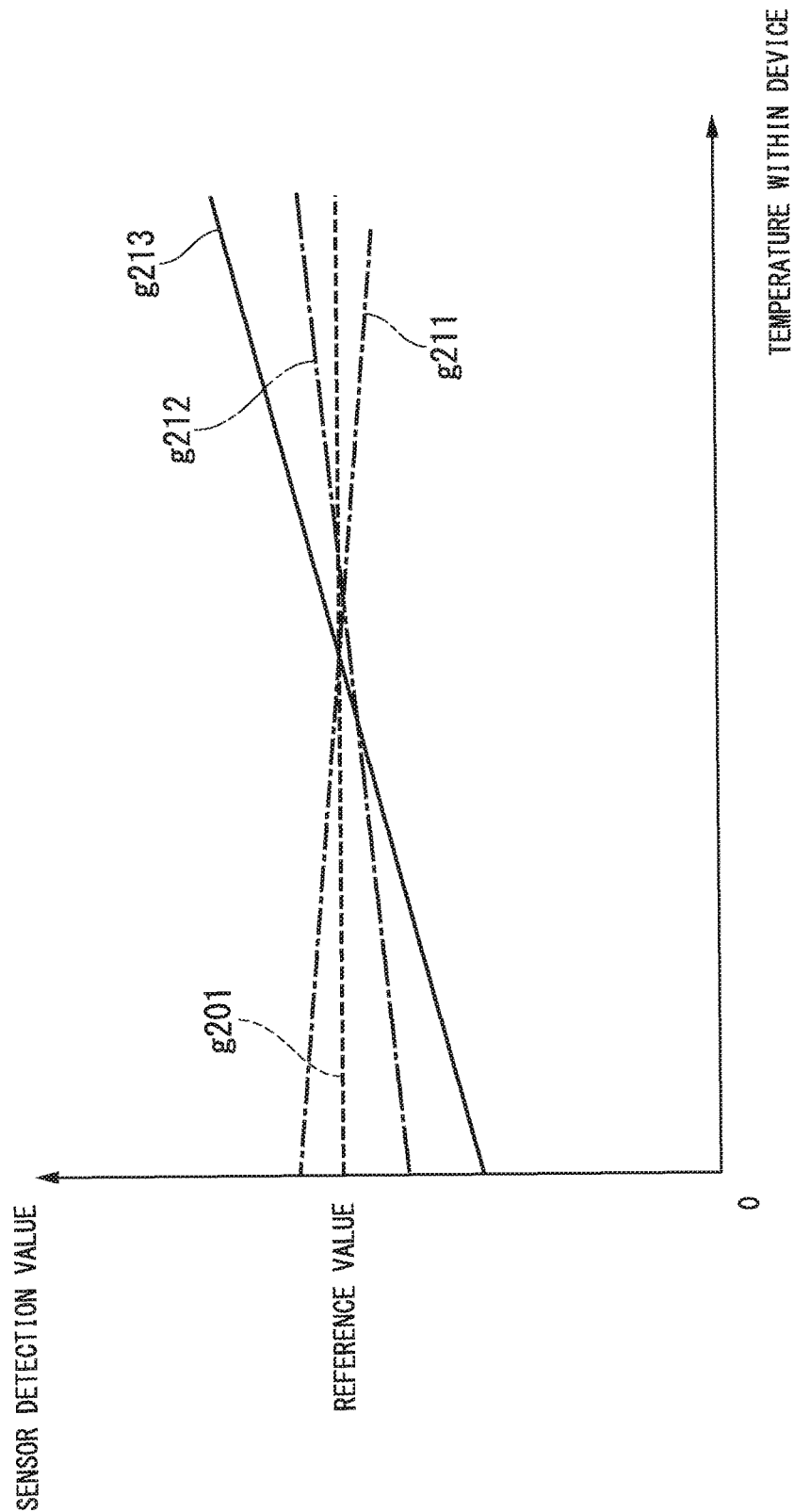
FIG. 3 is a diagram for describing temperature drift in a red color sensor according to the first exemplary embodiment.

Next, temperature drift of a detection value in the color sensor 300 is described, with reference to FIG. 3. FIG. 3 is a diagram for describing temperature drift in a red color sensor according to the present exemplary embodiment.

In FIG. 3, the horizontal axis represents temperature within the backlight device 1, and the vertical axis represents the magnitude of a detection value of the red color sensor. Moreover, in FIG. 3, the dashed line g201 represents a reference value, which is a detection value at the time of supplying a constant drive value to the backlight at a predetermined environmental temperature. The curved line g211 represents a temperature drift characteristic of the detection value detected by the red color sensor 301 at the time of driving only the red backlight 201. The curved line g212 represents a temperature drift characteristic of the detection value detected by the red color sensor 301 at the time of driving only the green backlight 202. The curved line g213 represents a temperature drift characteristic of the detection value detected by the red color sensor 301 at the time of driving only the blue backlight 203.

As shown in FIG. 3, the temperature drift characteristic of the detection value differs with each color of light received by the red color sensor 301. Similarly, the temperature drift characteristic of the detection value differs with each color of light received by the green color sensor 302, and the temperature drift characteristic of the detection value differs with each color of light received by the blue color sensor 303.

Next, an example of the calculation method of Equation (1) is described. When the detection values $Rs_1$, $Gs_1$, and $Bs_1$ of the respective color sensors are measured while only the red backlight 201 is made to emit light, the brightness component $R_1$ of the red backlight 201 is expressed as Equation (3) below. The brightness value of the red backlight 201 is a value found by multiplying the drive value by a predefined constant (for example, amplification multiplier of the driving circuit). Accordingly, the brightness component $R_1$ of the red backlight 201 is calculated by multiplying the drive value by the constant. The drive value is, for example, a known value such as driving current value or driving voltage value.

$$R_1 = a_{11} \times Rs_1 + a_{12} \times Gs_1 + a_{13} \times Bs_1 \quad (3)$$

In Equation (3), $a_{11}$, $a_{12}$, and $a_{13}$ are constants.

Next, when the detection values $Rs_2$, $Gs_2$, and $Bs_2$ of the respective color sensors are measured while only the green backlight 202 is made to emit light, the brightness component $G_1$ of the green backlight 202 is expressed as Equation (4) below. Similarly, the brightness component $G_1$ of the green backlight 202 is calculated by multiplying the drive value by the constant.

$$G_1 = a_{21} \times Rs_2 + a_{22} \times Gs_2 + a_{23} \times Bs_2 \quad (4)$$

In Equation (4), $a_{21}$, $a_{22}$, and $a_{23}$ are constants.

Next, when the detection values $Rs_3$, $Gs_3$, and $Bs_3$ of the respective color sensors are measured while only the blue backlight 203 is made to emit light, the brightness component $B_1$ of the blue backlight 203 is expressed as Equation (5) below. Similarly, the brightness component $B_3$ of the blue backlight 203 is calculated by multiplying the drive value by the constant.

$$B_3 = a_{31} \times Rs_3 + a_{32} \times Gs_3 + a_{33} \times Bs_3 \quad (5)$$

In Equation (5), $a_{31}$, $a_{32}$, and $a_{33}$ are constants.

Each constant in the simultaneous equations of Equation (3) through Equation (5) is calculated, using the detection value of each color sensor obtained while only each backlight is made to emit light at each of the three types of brightness, and using the brightness component of the red backlight 201, the green backlight 202, or the blue backlight 203. The result of performing calculation in this manner is $a_{11}=1.007$, $a_{12}=0.016$, $a_{13}=0.005$, $a_{21}=-0.155$, $a_{22}=1.225$, $a_{23}=-0.017$, $a_{31}=-0.046$, $a_{32}=0.014$, and $a_{33}=1.093$ as shown in Equation (1). The value of each element of Equation (1) is an example, and it may differ, depending on the characteristic, the light receiving sensitivity, and the light receiving band of each color filter of the red color sensor 301, the green color sensor 302, and the blue color sensor 303.

Figure 4:
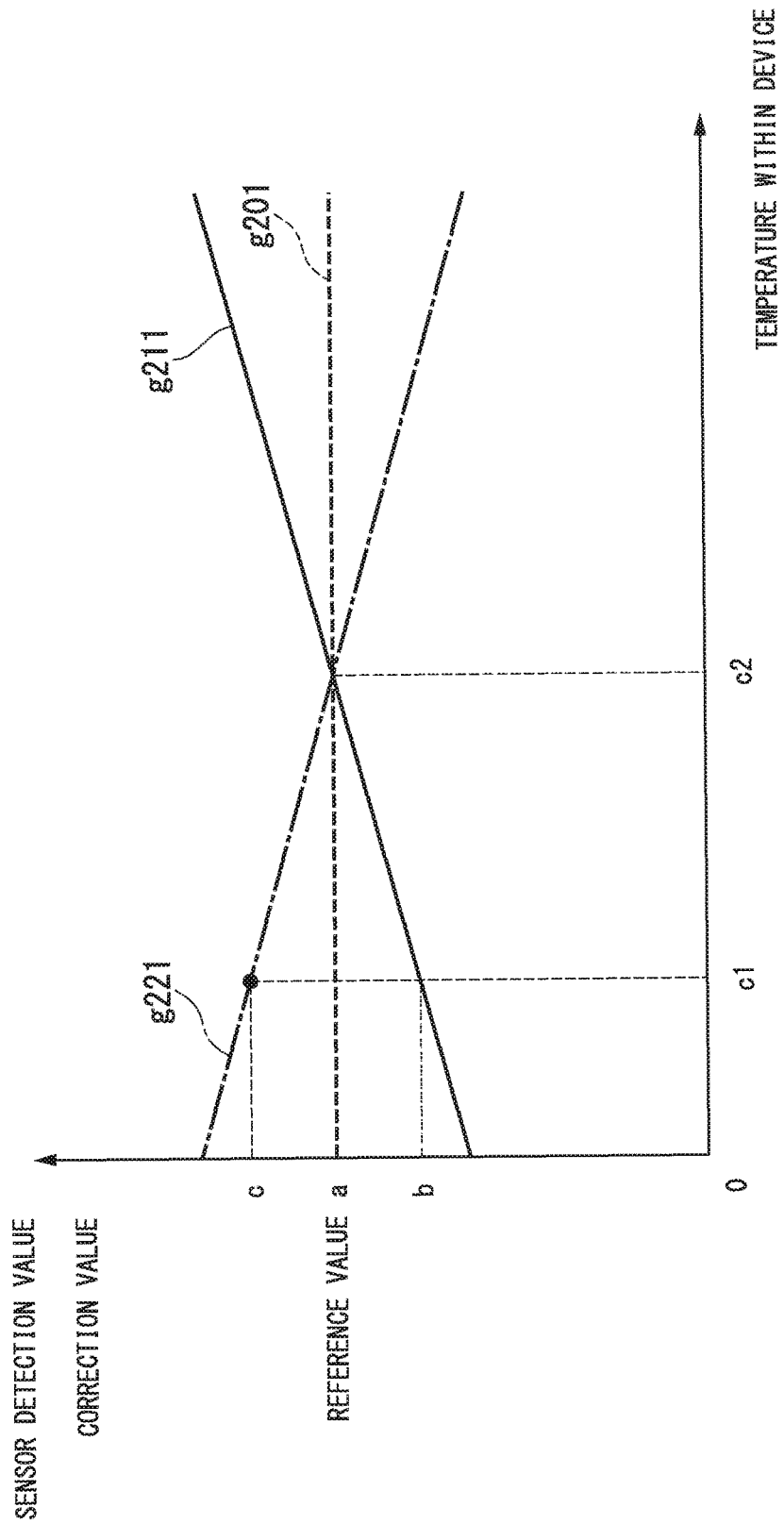
FIG. 4 is a diagram for describing temperature correction made to a red light emission color in the red color sensor according to the first exemplary embodiment.

Next, temperature correction performed by the temperature correction unit 510 is described, with reference to FIG. 4.

FIG. 4 is a diagram for describing temperature correction made to a red light emission color in the red color sensor according to the present exemplary embodiment. In FIG. 4, the horizontal axis represents temperature within the backlight device 1, and the vertical axis represents the magnitude of a detection value and the magnitude of a correction value in a case where the red light emission color is red in the red color sensor. Moreover, in FIG. 4, the dashed line g201 represents a reference value as with FIG. 3, and the curved line g211 represents the temperature drift characteristic of the detection value of the red color light emission color of the red color sensor 301 as with FIG. 3. The curved line 221 represents the relationship between temperature and temperature correction coefficient stored in the red color detection value temperature correction unit 511.

As shown in FIG. 4, the temperature correction coefficient stored in the red color detection value temperature correction unit 511 is a value for correcting the detection value of the red color light emission color (detection value of the component of the red backlight 201) to a reference value a, for each temperature measured by the temperature sensor 55. For example, when the temperature within the device measured by the temperature sensor 55 is c1, the detection value of the red color light emission color takes a detection value b due to the influence of temperature drift. The value of the temperature correction coefficient in this case is c. The red color detection value temperature correction unit 511 can perform temperature correction on the detection value b by multiplying the detection value b by the correction coefficient c. Moreover, when the temperature within the device is c2, the temperature correction coefficient value is 1 since the detection value a matches the reference value a.

The temperature correction coefficient stored in the red color detection value temperature correction unit 511 may be a temperature correction equation that expresses the relationship between temperature and a correction coefficient to be multiplied. In this case, the red color detection value temperature correction unit 511 uses the stored temperature correction equation to calculate the temperature correction coefficient based on the temperature measured by the temperature sensor 55. The red color detection value temperature correction unit 511 then multiplies the detection value by the calculated temperature correction coefficient to thereby perform temperature correction of the detection value.

Alternatively, the red color detection value temperature correction unit 511 may add the stored temperature correction coefficient to the detection value to perform temperature correction. In this case, when the temperature within the device is c1, the temperature correction coefficient to be added is c' (not shown in the figure). The red color detection value temperature correction unit 511 then adds the temperature correction coefficient c' to the detection value b to thereby perform temperature correction. Moreover, when the temperature within the device is c2, the temperature correction coefficient value to be added is 0 since the detection value a matches the reference value a. The red color detection value temperature correction unit 511 may store temperature and the temperature correction coefficient for correcting temperature by being added to the detection value in this manner, while associating them with each other. Also in this case, the temperature correction coefficient stored in the red color detection value temperature correction unit 511 may be a temperature correction equation that expresses the relationship between the temperature and the correction coefficient to be added.

Similarly, in the case of the green detection value temperature correction unit 512, the temperature drift characteristic for the detection value of the red backlight 201, the temperature drift characteristic for the detection value of the green back light 202, and the temperature drift characteristic for the detection value of the blue backlight 203, of the green color sensor 302 are also different. The green color detection value temperature correction unit 512 performs temperature correction on the detection value Gs of the component of the green backlight 202, using the temperature correction equation or temperature correction coefficient for the component of the green backlight 202.

Similarly, in the case of the blue detection value temperature correction unit 513, the temperature drift characteristic for the detection value of the red backlight 201, the temperature drift characteristic for the detection value of the green back light 202, and the temperature drift characteristic for the detection value of the blue backlight 203, of the green color sensor 302 are different. The blue color detection value temperature correction unit 513 performs temperature correction on the detection value Gs of the component of the blue backlight 203, using the temperature correction equation or temperature correction coefficient for the component of the blue backlight 203.

Next, a temperature correction method for the backlight device 1 of the present exemplary embodiment is described. First, steps of temperature correction for the brightness of the red backlight 201 are described.

The detection unit 30 receives light emitted from the light emitting unit 20, and then outputs a detection value that has been converted from the received light amount into an electric signal, to the calculation unit 50.

Subsequently, a sensor value/BL brightness first conversion unit 501 of the calculation unit 50 converts the detection value output from the detection unit 30 into a detection value Rs of the component of the red backlight 201, using Equation (1). The sensor value/BL brightness first conversion unit 501 then outputs the converted detection value Rs of the component of the red backlight 201 to the red color detection value temperature correction unit 511.

Then, the red color detection value temperature correction unit 511 performs temperature correction on the detection value Rs of the component of the red backlight 201, using the information that indicates the temperature detected by the temperature sensor 55 and a preliminarily stored temperature correction equation or temperature correction coefficient, and outputs the corrected detection value Rs' to the BL brightness/sensor value first conversion unit 521.

Next, the BL brightness/sensor value first conversion unit 521 converts the temperature-corrected detection value Rs' output from the temperature correction unit 510 into a detection value Rs', which is a detection value of the red color sensor 301, using Equation (2). The BL brightness/sensor value first conversion unit 521 outputs the converted detection value Rs' to the red backlight drive value calculation unit 541.

Then, the red backlight drive value calculation unit 541 compares the target value for the detection value of the red color sensor 301, which is output from the red sensor target value calculation unit 531, with the detection value Rs', which is output from the BL brightness/sensor value first conversion unit 521, and generates a driving signal of the red backlight 201 based on the result of the comparison.

With the above process, the backlight device 1 can perform temperature correction for the temperature drift of the red color sensor 301.

Similarly, the sensor value/BL brightness second conversion unit 502 converts the detection value output from the detection unit 30 into a detection value G of the component of the green backlight 202. The sensor value/BL brightness third conversion unit 503 converts the detection value output from the detection unit 30 into a detection value B of the component of the blue backlight 203. Next, the green color detection value temperature correction unit 512 and the blue color detection value temperature correction unit 513 performs temperature correction on each detection value of each backlight component, which has been converted in the above manner, using the information indicating the temperature detected by the temperature sensor 55, and the preliminarily stored temperature correction equation or temperature correction coefficient. In this manner, the backlight device 1 uses the corrected detection values Gs' and Bs' to perform temperature correction for the brightness of the green and blue backlights as with the brightness of the red back light 201.

Figure 5:
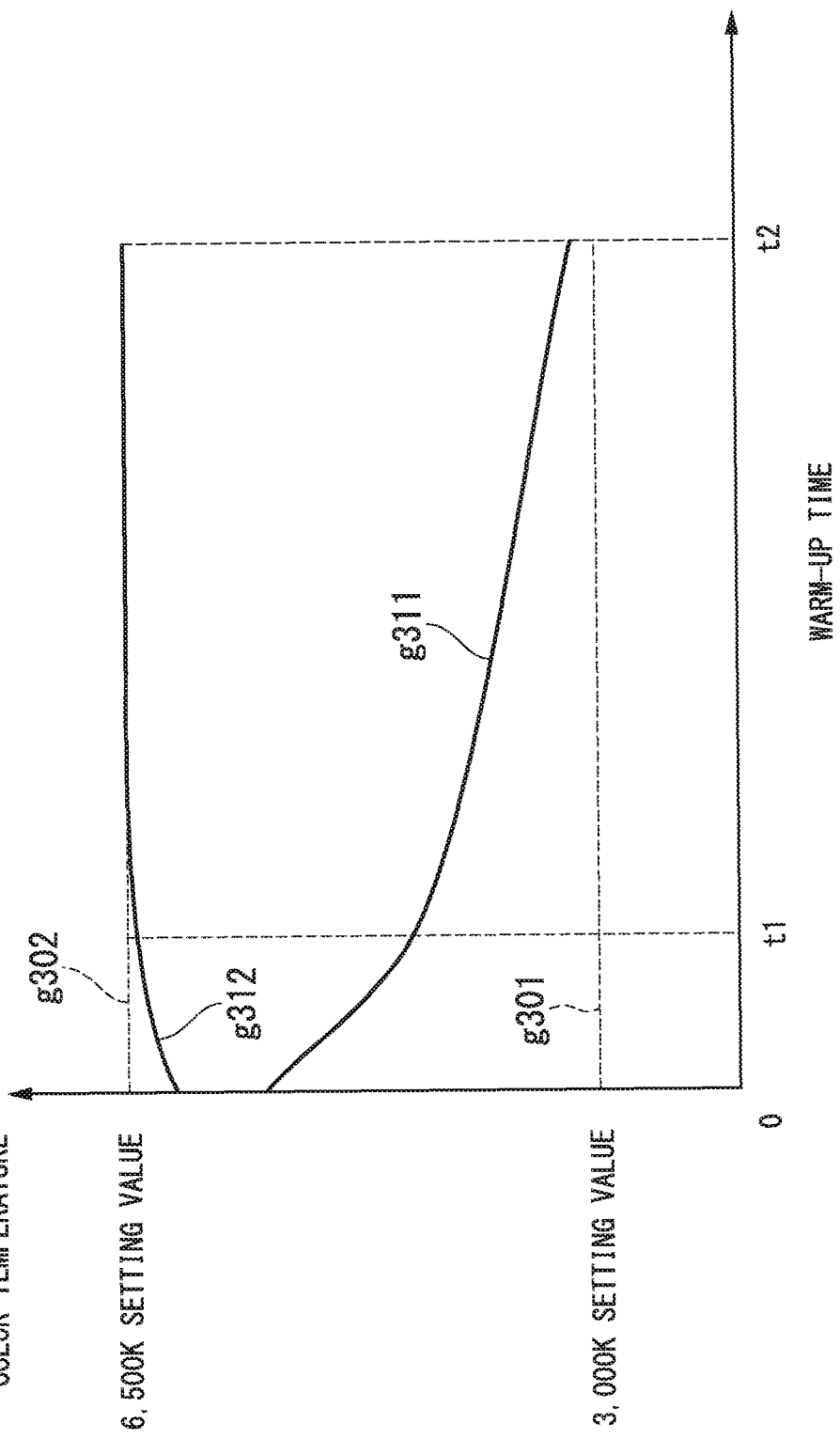
FIG. 5 is a diagram for describing an example of color temperature changes in a case where a temperature correction is made regarding a temperature drift characteristic of a color sensor.
Figure 6:
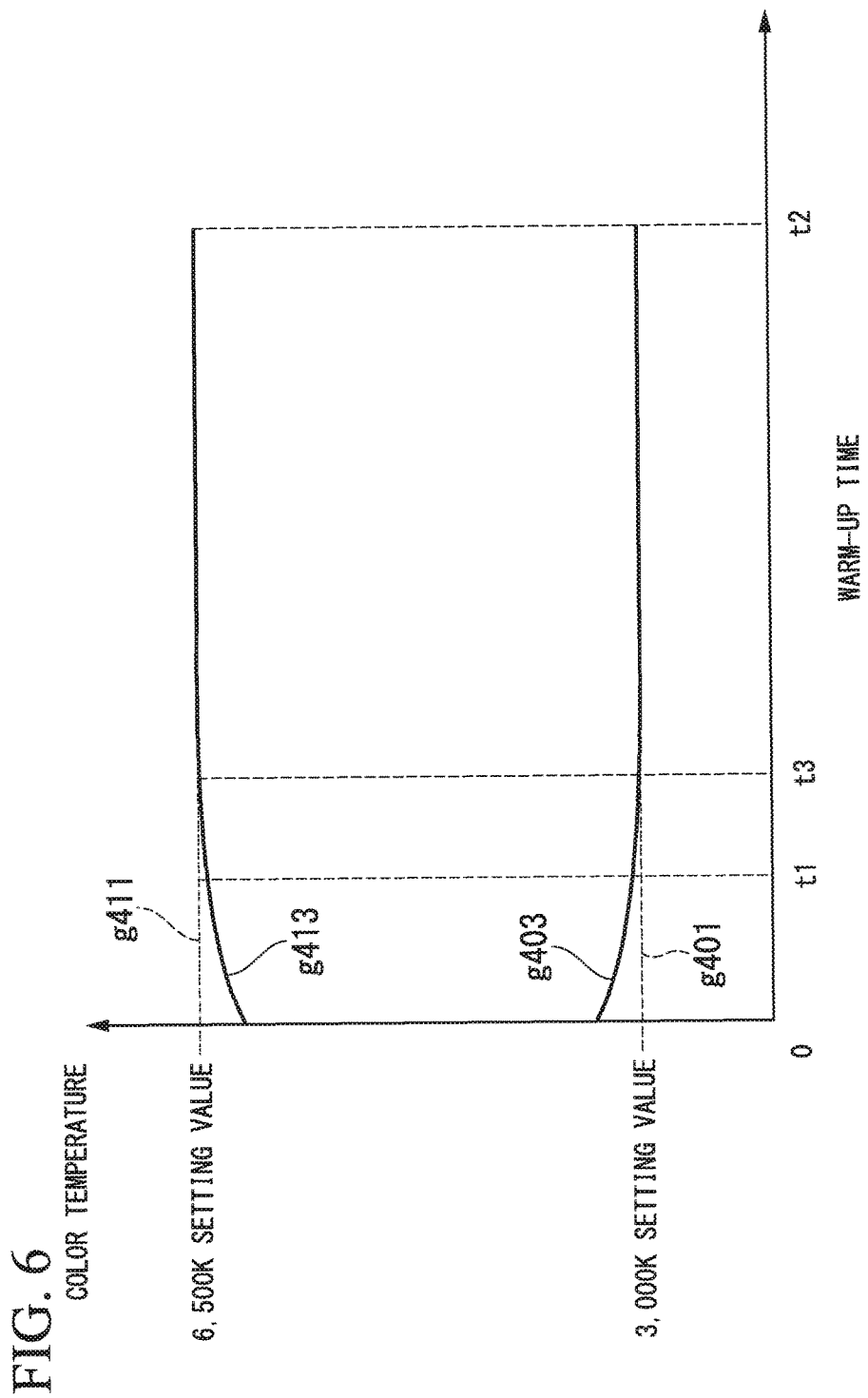
FIG. 6 is a diagram for describing an example of color temperature changes in a case where a temperature correction is made for each color of the backlight according to the first exemplary embodiment.

Next, an example of color temperature changes in the backlight device 1 due to temperature drift is described, with reference to FIG. 5 and FIG. 6.

FIG. 5 is a diagram for describing an example of color temperature changes in a case where a temperature correction is made to a temperature drift characteristic of a color sensor. FIG. 6 is a diagram for describing an example of color temperature changes in a case where a temperature correction is made to each color of the backlight according to the present exemplary embodiment.

In FIG. 5 and FIG. 6, the horizontal axis represents warm-up time, and the vertical axis represents color temperature level. The warm-up time refers to a length of time elapsed after the power supply of the backlight device 1 is switched on.

In FIG. 5, the dashed line g301 represents a setting value where the color temperature is set to 3,000 [K (Kelvin)], and the dashed line g302 represents a setting value where the color temperature is set to 6,500 [K]. Moreover, the curved line g311 represents changes in the color temperature characteristic in the display unit (not shown in the figure) where the color temperature is set to 3,000 [K]. The curved line g312 represents changes in the color temperature characteristic in the display unit where the color temperature is set to 6,500 [K].

In FIG. 6, the dashed line g401 represents a setting value where the color temperature is set to 3,000 [K (Kelvin)], and the dashed line g402 represents a setting value where the color temperature is set to 6,500 [K]. Moreover, the curved line g411 represents changes in the color temperature characteristic in the display unit where the color temperature is set to 3,000 [K]. The curved line g412 represents changes in the color temperature characteristic in the display unit where the color temperature is set to 6,500 [K].

FIG. 5 shows changes in the color temperature in the display unit with respect to the warm-up time in the supposed case where the temperature correction unit provided in the backlight device performs temperature correction for the temperature drift characteristic of the detection value of each color sensor. In this case, for example, temperature correction is performed on the detection value of the red color sensor based on the temperature drift characteristic of the detection value at the time of the red color sensor receiving white color light. Similarly, temperature correction is performed on the detection value of the green color sensor based on the temperature drift characteristic of the detection value at the time of the green color sensor receiving white color light. Furthermore, temperature correction is performed on the detection value of the blue color sensor based on the temperature drift characteristic of the detection value at the time of the blue color sensor receiving white color light.

When a user sets white point chromaticity in an image display device having a backlight device that performs temperature correction in this manner, if the color temperature is set to 6,500 [K], the color temperature of the display unit converges to the setting value at time t1 as illustrated with the curved line g312. However, if the color temperature is set to 3,000 [K], the color temperature of the display unit still does not take the setting value even at time t2 as illustrated with the curved line g311. In this way, the color temperature convergence time for the warm-up time differs for each set white point setting.

On the other hand, as shown in FIG. 6, in the case where the detection value of each color sensor is converted into a detection value of the component of the backlight and it is temperature-corrected to the converted detection value of the backlight component as practiced in the present exemplary embodiment, if the color temperature is set to 6,500 [K], the color temperature of the display unit takes the setting value at time t1 as illustrated with the curved line g413. Next, if the color temperature is set to 3,000 [K], the color temperature of the display unit takes the setting value at time t3, at which a shorter length of time has elapsed than time t2, as illustrated with the curved line g403. In this manner, according to the present exemplary embodiment, it is possible to reduce the length of time taken by the color temperature of the display unit to converge, and match the convergence time for each white point setting.

As described above, the backlight device 1 of the present exemplary embodiment converts the detection value detected by the color sensor into a detection value of the component of each backlight. The backlight device 1 of the present exemplary embodiment perform temperature correction on the converted detection value of the backlight component, using a temperature correction equation or temperature correction coefficient that is preliminarily set for each color component. The drive value calculation unit 540 compares each target value output from the sensor target value calculation unit 530 with each corrected detection value output from the BL brightness/sensor value conversion unit 520. The drive value calculation unit 540 generates each driving signal for the light emitting unit 20 based on the comparison result, and drives each backlight of the light emitting unit 20 with each generated driving signal.

As a result, the backlight device 1 of the present exemplary embodiment can suppress temperature drift of the brightness of each backlight with respect to the temperature, and therefore, can reduce the convergence time to achieve the set white point.

Second Exemplary Embodiment

Figure 7:
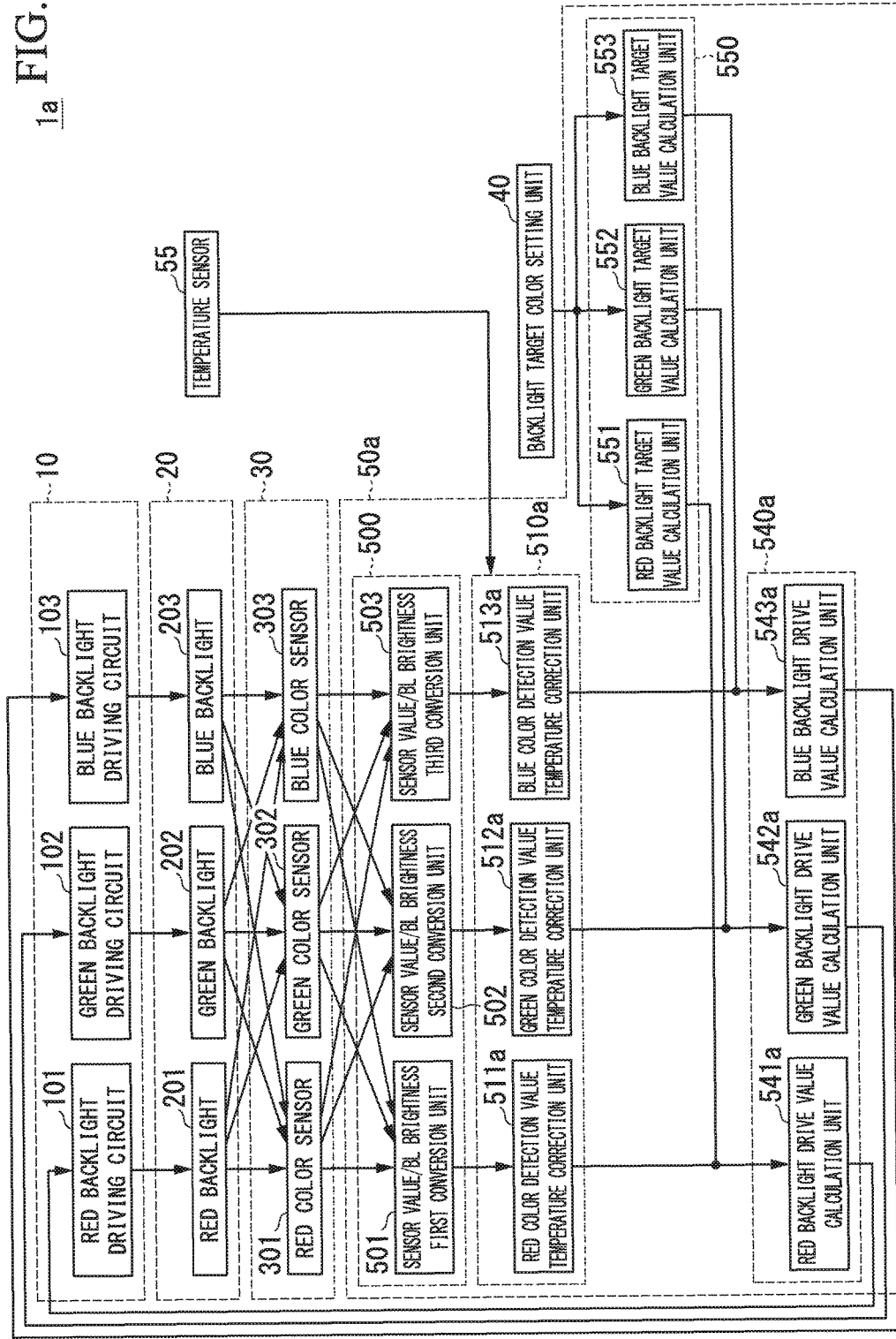
FIG. 7 is a block diagram of a schematic configuration of a backlight device according to a second exemplary embodiment.

FIG. 7 is a block diagram of a schematic configuration of a backlight device 1a according to the present exemplary embodiment. As shown in FIG. 7, the backlight device 1a includes a backlight driving unit 10, a light emitting unit 20, a detection unit 30, a backlight target color setting unit 40, and a calculation unit 50a. Moreover, the calculation unit 50a includes a sensor value/BL brightness conversion unit 500 (conversion unit), a temperature correction unit 510a, a drive value calculation unit 540a, and a backlight target value calculation unit 550.

The same reference symbols are given to the functional units with the same function in the backlight device 1 described in the first exemplary embodiment, and descriptions thereof are omitted.

The temperature correction unit 510a includes a red color detection value temperature correction unit 511a, a green color detection value temperature correction unit 512a, and a blue color detection value temperature correction unit 513a.

As with the first exemplary embodiment, the red color detection value temperature correction unit 511a corrects the detection value Rs output from the sensor value/BL brightness first conversion unit 501, using a temperature correction equation or temperature correction coefficient for the red backlight component, and outputs the corrected detection value R' to a red backlight drive value calculation unit 541a. As with the first exemplary embodiment, the green color detection value temperature correction unit 512a corrects the detection value Gs output from the sensor value/BL brightness second conversion unit 502, using a temperature correction equation or temperature correction coefficient for the green backlight component, and outputs the corrected detection value G' to a green backlight drive value calculation unit 542a. As with the first exemplary embodiment, the blue color detection value temperature correction unit 513a corrects the detection value B output from the sensor value/BL brightness third conversion unit 503, using a temperature correction equation or temperature correction coefficient for the blue backlight component, and outputs the corrected detection value B' to a blue backlight drive value calculation unit 543a.

That is to say, in the present exemplary embodiment, the calculation unit 50a outputs the detection values (R', G', and B') corrected by the temperature correction unit 510a to the drive value calculation unit 540a without converting them to the detection values of the sensors using Equation (2) as described in the first exemplary embodiment.

The backlight target value calculation unit 550 (target value calculation unit) includes a red backlight target value calculation unit 551, a green backlight target value calculation unit 552, and a blue backlight target value calculation unit 553.

The red backlight target value calculation unit 551 calculates a target value for the brightness of the red backlight 201, based on a setting value for the red backlight 201 at the time of white color light emission, which is output from the backlight target color setting unit 40. The red sensor target value calculation unit 531 outputs the calculated target value for the brightness of the red backlight 201 to the red backlight drive value calculation unit 541a. The green backlight target value calculation unit 552 calculates a target value for the brightness of the green backlight 202, based on a setting value for the green backlight 202 at the time of white color light emission, which is output from the backlight target color setting unit 40. The green sensor target value calculation unit 532 outputs the calculated target value for the brightness of the green backlight 202 to the green backlight drive value calculation unit 542a. The blue backlight target value calculation unit 553 calculates a target value for the brightness of the blue backlight 203, based on a setting value for the blue backlight 203 at the time of white color light emission, which is output from the backlight target color setting unit 40. The blue sensor target value calculation unit 533 outputs the calculated target value for the brightness of the blue backlight 203 to the blue backlight drive value calculation unit 543a.

The drive value calculation unit 540a includes a red backlight drive value calculation unit 541a, a green backlight drive value calculation unit 542a, and a blue backlight drive value calculation unit 543a.

The red backlight drive value calculation unit 541a compares the target value for the brightness of the red backlight 201, which is output from the red backlight target value calculation unit 551, with the detection value R', which is output from the red color detection value temperature correction unit 511a. The red backlight drive value calculation unit 541a generates a driving signal of the red backlight 201 based on the result of the comparison, and outputs the generated driving signal to the red backlight driving circuit 101. The green backlight drive value calculation unit 542*a* compares the target value for the brightness of the green backlight 202, which is output from the green backlight target value calculation unit 552, with the detection value G', which is output from the green color detection value temperature correction unit 512*a*. The green backlight drive value calculation unit 542*a* generates a driving signal of the green backlight 202 based on the result of the comparison, and outputs the generated driving signal to the green backlight driving circuit 102. The blue backlight drive value calculation unit 543*a* compares the target value for the brightness of the blue backlight 203, which is output from the blue backlight target value calculation unit 553, with the detection value B', which is output from the blue color detection value temperature correction unit 513*a*. The blue backlight drive value calculation unit 543*a* generates a driving signal of the blue backlight 203 based on the result of the comparison, and outputs the generated driving signal to the blue backlight driving circuit 103.

That is to say, the drive value calculation unit 540*a* of the present exemplary embodiment compares the detection values (R', G', and B') of each temperature-corrected color component of the backlight, with the target value output from the backlight target value calculation unit 550, to control the driving signal of each backlight.

Next, a temperature correction method for the backlight device 1*a* of the present exemplary embodiment is described. First, steps of temperature correction for the brightness of the red backlight 201 are described.

The detection unit 30 receives light emitted from the light emitting unit 20, and outputs a detection value that has been converted from the received light amount into an electric signal, to the calculation unit 50.

Subsequently, a sensor value/BL brightness first conversion unit 501 of the calculation unit 50 converts the detection value output from the detection unit 30 into a detection value R of the component of the red backlight 201, using Equation (1). The sensor value/BL brightness first conversion unit 501 outputs the converted brightness value R of the red backlight 201, to the red color detection value temperature correction unit 511*a*.

Then, the red color detection value temperature correction unit 511*a* performs temperature correction on the detection value R of the component of the red backlight 201, using the information that indicates the temperature detected by the temperature sensor 55 and a preliminarily stored temperature correction equation or temperature correction coefficient, and outputs the corrected detection value R' to the red backlight drive value calculation unit 541*a*.

Then, the red backlight drive value calculation unit 541*a* compares the target value for the detection value of the red color sensor 301, which is output from the red backlight target value calculation unit 551, with the temperature-corrected detection value R', which is output from the red color detection value temperature correction unit 511*a*, and generates a driving signal of the red backlight 201 based on the result of the comparison.

With the above process, the backlight device 1*a* can perform temperature correction for the temperature drift of the red color sensor 301.

Similarly, the sensor value/BL brightness second conversion unit 502 converts the detection value output from the detection unit 30 into a brightness value G of the green backlight 202. The sensor value/BL brightness third conversion unit 503 converts the detection value output from the detection unit 30 into a brightness value B of the blue backlight 203. Next, the green color detection value temperature correction unit 512*a* and the blue color detection value temperature correction unit 513*a* performs temperature correction on the brightness value of each backlight component, which has been converted in the above manner so that the brightness value of each backlight takes the reference value, using the information indicating the temperature detected by the temperature sensor 55, and the preliminarily stored correction equation or correction coefficient. In this manner, the backlight device 1 uses the corrected brightness values G' and B' to perform temperature correction for the brightness of the green and blue backlights as with the brightness of the red back light 201.

As described above, the backlight device 1*a* of the present exemplary embodiment compares the temperature-corrected detection values (R', G', and B') of each color component of the backlight, with the target value output from the backlight target value calculation unit 550, to control the driving signal of each backlight.

As a result, in addition to the effect of the first exemplary embodiment, the backlight device 1*a* of the present exemplary embodiment can eliminate the BL brightness/sensor value conversion unit 520 for converting the temperature-corrected detection value to a detection value of each color sensor.

When using the backlight device 1 or backlight device 1*a* of the first or second exemplary embodiment in an image display device, it is possible to improve color reproducibility, and therefore, there is an effect of realizing, for example, a high-image-quality image confirmation display for graphic design and broadcasting purposes, and a display for medical purposes.

Moreover, the sensor value/BL brightness conversion unit 500 functions as a signal filter as illustrated with Equation (1). Accordingly, this sensor value/BL brightness conversion unit 500 may be configured with an analog circuit, a digital circuit, or a DSP (digital signal processor) or an ASIC (application specific integrated circuit).

In the present exemplary embodiments, there has been described an example in which the light emitting unit 20 includes a red backlight 201, a green backlight 202, and a blue backlight 203. However, the light emitting unit 20 may include backlights of colors other than RGB such as CMYG (cyan, magenta, yellow, and green) colors. In this case, the detection unit 30 may include a color sensor that matches the wavelength band of the backlights provided in the light emitting unit 20, and the calculation unit 50 (or 50*a*) may include a sensor value/BL brightness conversion unit 500, a temperature correction unit 510 (or 510*a*), a sensor target value calculation unit 530, a backlight target value calculation unit 550, and a drive value calculation unit 540 (or 540*a*) that match the wavelength band of the backlights provided in the light emitting unit 20.

In the present exemplary embodiments, the sensor detection value is temperature-corrected, and then it is compared with the target value. However, conversely, the target value may be temperature-corrected, and it may then be compared with the sensor detection value.

In the present exemplary embodiment, there has been described an example of providing a single sensor value/BL brightness conversion unit 500 and a single temperature correction unit 510. However, for example, a sensor value/BL brightness conversion unit 500 and a temperature correction unit 510 may be provided for each color of color sensors.

The backlight device 1 (or 1*a*) of the present exemplary embodiments may be applied to a liquid crystal display device, a mobile information terminal, a navigation system, an advertisement display lamp, an electronic sign board (digital signage), or the like.

When using the backlight device 1 of the present exemplary embodiment in a liquid crystal display device, the red backlight 201, the green backlight 202, and the blue backlight 203 may be divided into a plurality of blocks, and lighting control may be performed individually for each of the plurality of divided blocks.

A program for realizing the function of the calculation unit 50 of FIG. 1 or the calculation unit 50a of FIG. 7 of the exemplary embodiments may be recorded on a computer-readable recording medium, and the program recorded on this recording medium may be read on a computer system and executed, to thereby perform the process of each unit. The "computer system" includes an OS and hardware such as peripheral devices.

Moreover, the "computer system" includes a homepage provision environment (or display environment) in the case of using a WWW system.

Furthermore, the "computer-readable recording medium" refers to a movable medium such as a flexible disc, magneto-optical disc, ROM (read-only memory), and CD-ROM, a USB memory connected through USB (universal serial bus) I/F (interface), and a memory device such as a hard disk drive built in a computer system. Moreover, the "computer-readable recording medium" includes one that retains a program for a certain length of time such as volatile memory within a computer system serving as a server or a client. The above program may realize part of the functions described above, and further, the program may realize the functions described above in combination with a program that is already recorded on the computer system.

REFERENCE SYMBOLS

1, 1a Backlight device
10 Backlight driving unit
20 Light emitting unit
30 Detection unit
301 Red color sensor
302 Green color sensor
303 Blue color sensor
40 Backlight target color setting unit
50, 50a Calculation unit
55 Temperature sensor
101 Red backlight driving circuit
102 Green backlight driving circuit
103 Blue backlight driving circuit
201 Blue backlight
202 Green backlight
203 Red backlight
301 Red color sensor
302 Green color sensor
303 Blue color sensor
501 Sensor value/BL brightness first conversion unit
500 Sensor value/BL brightness conversion unit
510 Temperature correction unit
520 BL brightness/sensor value conversion unit
530 Sensor target value calculation unit
540, 540a Drive value calculation unit
550 Backlight target value calculation unit

What is claimed is:

1. A backlight device, comprising:
 a plurality of light sources that emit light of a plurality of light emission colors, each of the light sources emitting light of a different light emission color;
 a plurality of color sensors, each of the color sensors receiving mixed-color light emitted from the light sources to detect light emission states of the light sources, the mixed-color light including a mixture of a component of each of the light emission colors;
 a temperature sensor that measures a temperature in a proximity of the plurality of light sources;
 a brightness conversion unit that separates the mixed-color light to obtain a detection value for each component of the light emission colors by converting values indicating the detected light emission states; and
 a calculation unit that corrects the obtained detection value by using information indicating a relationship between the measured temperature and a correction value, the calculation unit determining drive values for the light sources based on the corrected detection value.

2. The backlight device according to claim 1, wherein the detected light emission states include brightness values of light according to spectral sensitivity corresponding to each of the light emission colors.

3. The backlight device according to claim 1, wherein the brightness conversion unit converts the values indicating the detected light emission states by using a relationship equation indicating a relationship between the detected light emission states and a value based on a brightness value of each of the light sources.

4. The backlight device according to claim 1, wherein the correction value comprises a value for correcting the obtained detection value into a detection value at a predefined temperature.

5. The backlight device according to claim 1, wherein said each of the color sensors has a spectral sensitivity characteristic corresponding to a light emission color of the light emission colors.

6. The backlight device according to claim 1, wherein the color sensors detect light to obtain corresponding detection values from the mixed-color light.

7. The backlight device according to claim 6, wherein the brightness conversion unit separates the mixed-color light based on a correspondence relationship between the detection values.

8. The backlight device according to claim 6, wherein the detection values include brightness values of light extracted from the light emitted from the light sources based on spectral sensitivity corresponding to each of the light emission colors of the light sources.

9. The backlight device according to claim 1, further comprising:
 a temperature correction unit that receives an input of data that indicates the temperature detected by the temperature sensor.

10. The backlight device according to claim 9, wherein the corrected detection value comprises a temperature-corrected detection value that is output from the temperature correction unit.

11. A backlight control method for a backlight device comprising a plurality of light sources that emit light of a plurality of light emission colors, each of the light sources emitting light of a different light emission color, the method comprising:
 receiving, by each of a plurality of color sensors, mixed-color light emitted from the light sources to detect light emission states of the light sources, the mixed-color light including a mixture of a component of each of the light emission colors;

measuring a temperature in a proximity of the plurality of light sources;

separating the mixed-color light to obtain a detection value for each component of the light emission colors by converting values indicating the detected light emission states; and correcting the obtained detection value by using information indicating a relationship between the measured temperature and a correction value, and determining drive values for the light sources based on the corrected detection value.

12. The backlight control method according to claim 11, wherein said each of the color sensors has a spectral sensitivity characteristic corresponding to a light emission color of the light emission colors.

13. The backlight control method according to claim 11, wherein the color sensors detect light to obtain corresponding detection values from the mixed-color light.

14. The backlight control method according to claim 13, where the separating the mixed-color light is based on a correspondence relationship between the detection values.

15. The backlight device according to claim 13, wherein the detection values include brightness values of light extracted from the light emitted from the light sources based on spectral sensitivity corresponding to each of the light emission colors of the light sources.

16. The backlight control method according to claim 11, further comprising:

receiving an input of data that indicates the measured temperature.

17. The backlight control method according to claim 16, wherein the corrected detection value comprises a temperature-corrected detection value that is output from a temperature correction unit that receives the input of the data form a temperature sensor that measures the temperature in the proximity of the plurality of light sources.

* * * * *